S. B. HARNER.
MILKING MACHINE.
APPLICATION FILED FEB. 21, 1916.
1,210,468.
Patented Jan. 2, 1917.
2 SHEETS—SHEET 1.
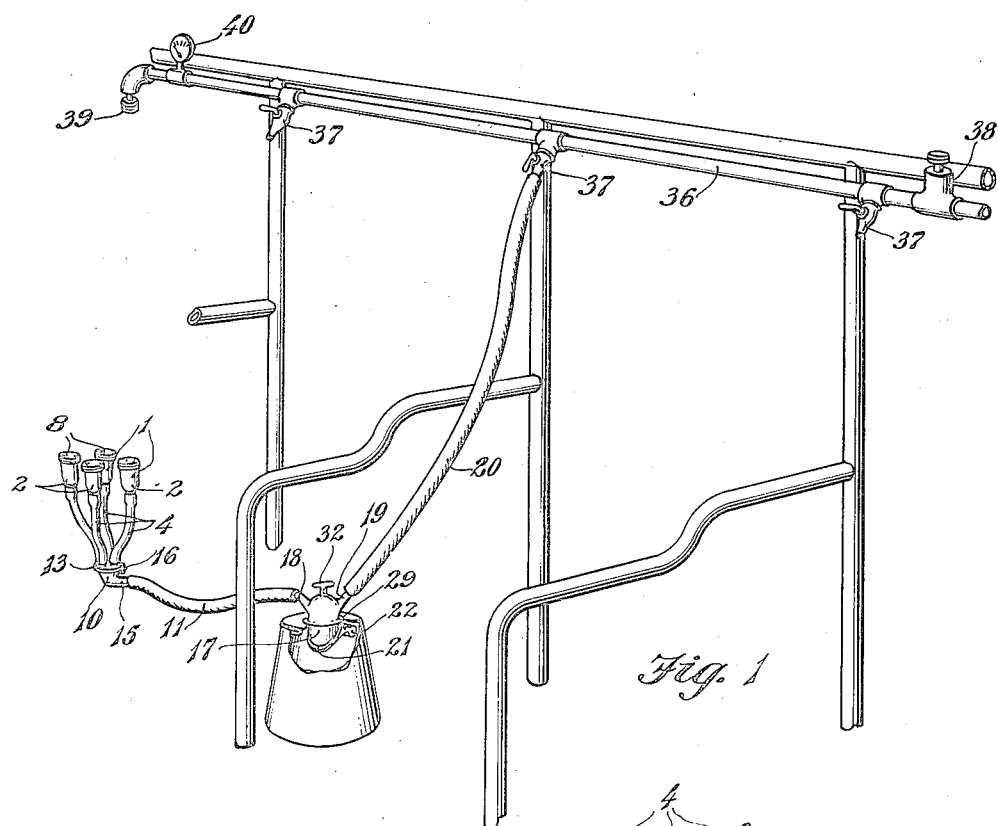
Fig. 1
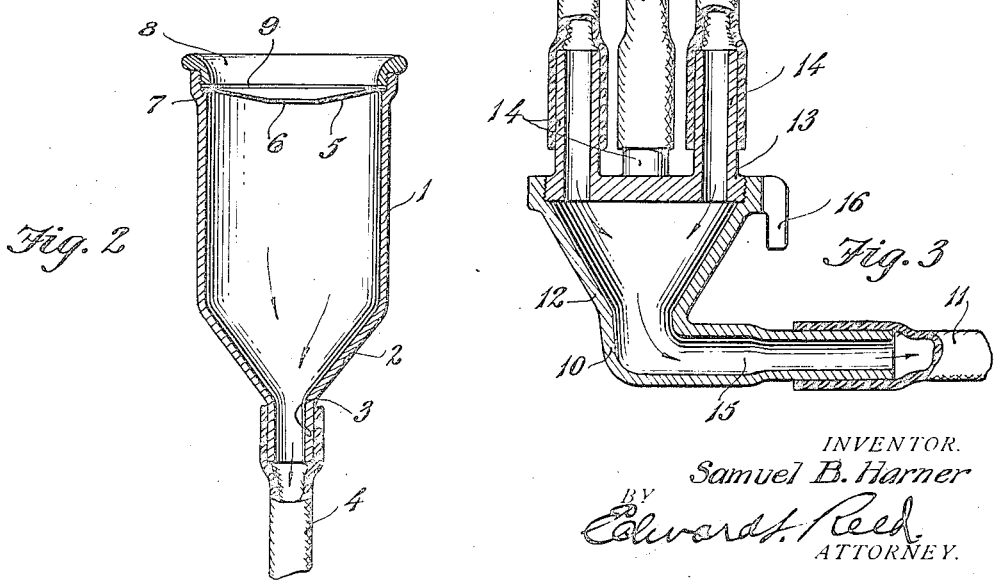
Fig. 2
Fig. 3
INVENTOR.
Samuel B. Harner
BY Edward␣F. Reed
ATTORNEY.

S. B. HARNER.
MILKING MACHINE.
APPLICATION FILED FEB. 21, 1916.
1,210,468.
Patented Jan. 2, 1917.
2 SHEETS—SHEET 2.
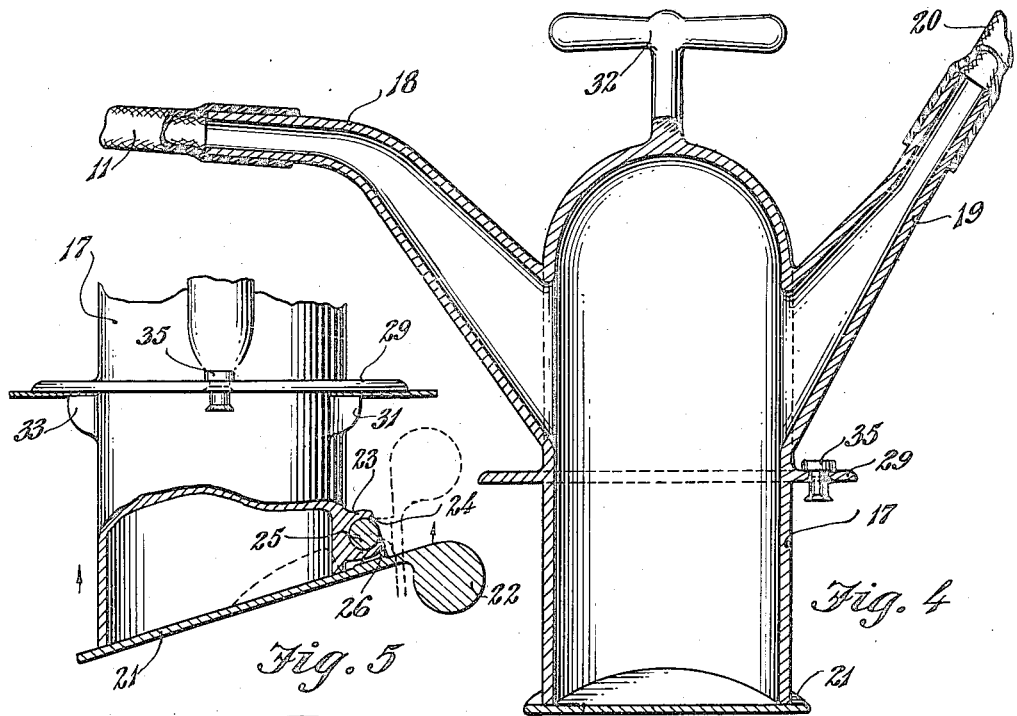
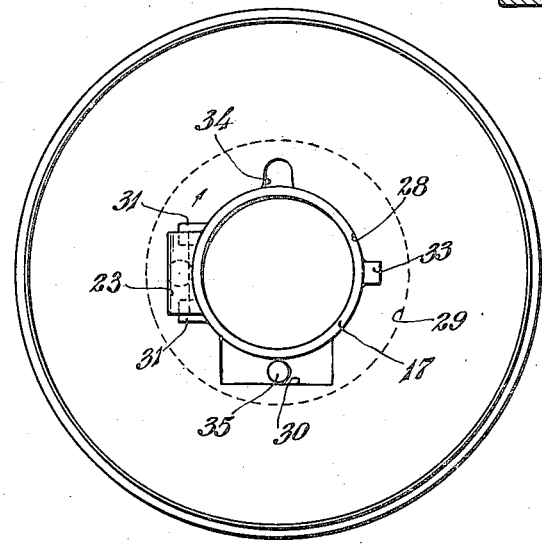
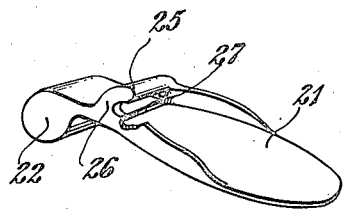
INVENTOR.
Samuel B. Harner
BY Edward Reed
ATTORNEY.

UNITED STATES PATENT OFFICE.

SAMUEL B. HARNER, OF NEAR XENIA, OHIO.

MILKING-MACHINE.

1,210,468.  Specification of Letters Patent.  Patented Jan. 2, 1917.

Application filed February 21, 1916. Serial No. 79,496.

*To all whom it may concern:*

Be it known that I, SAMUEL B. HARNER, a citizen of the United States, residing near Xenia, in the county of Greene and State of Ohio, have invented certain new and useful Improvements in Milking-Machines, of which the following is a specification, reference being had therein to the accompanying drawing.

This invention relates to milking machines and the object of the invention is to provide a machine of this kind which will be very simple in its construction; which will have a high degree of efficiency; and which will be very easily cleaned and therefore highly sanitary.

To accomplish this it is a further object of the invention to provide a teat-cup of such a shape and so constructed that it will allow a free and unrestricted action of the teat, and, further, that it will so act upon the udder as to facilitate the flow of milk; and also to provide a connecting manifold, or "claw", of such a character that it can be easily taken apart and cleaned and will have no recesses, or corners, likely to retain the milk.

It is a further object of the invention to provide a milk chamber, or suction chamber, of such a shape and character that the milk will flow freely through the same without any tendency to enter the air conduit, and from which the valve, or closure, may be readily removed; and also to provide means for attaching the casing in which the milk chamber is formed to the receptacle in such a manner that it can be quickly and easily removed from or applied to the receptacle without the use of retaining devices which would be difficult to clean.

It is a further object of the invention to provide means for actuating a plurality of milking units from the single air pump and to control the pressure on the relief stroke of the pump.

Other objects and advantages will appear as the invention is described.

In the accompanying drawings Figure 1 is a perspective view of an apparatus embodying my invention, showing the same installed in a cow barn; Fig. 2 is a detail sectional view of the teat-cup; Fig. 3 is a detail sectional view of the claw; Fig. 4 is a detail sectional view of the milk chamber; Fig. 5 is a side elevation of the lower portion of the milk chamber partially broken away to show the means of connecting the valve thereto; Fig. 6 is a bottom plan view of the lid for the milk receptacle with the valve removed from the milk chamber; and Fig. 7 is a detail view of the valve.

In these drawings I have illustrated one embodiment of my invention and have shown the same as comprising a group of teat cups communicating through a manifold, or "claw", with a milk chamber, or suction chamber, which is connected with the suction apparatus and which receives the milk and discharges the same into a pail on which the suction chamber is mounted. As is customary in milking machines, a reciprocatory air pump is used which on one stroke produces a suction in the device which serves to draw the milk from the teats and on the other stroke creates a pressure in the system which not only relieves the vacuum and permits the teats to expand so that the milk will again flow into them from the udder, but also forces open the valve of the milk chamber and permits the milk which has accumulated therein to escape into the pail.

The teat-cups, of which there are four are of such a character that the teat may be drawn into the same to the fullest extent without being pinched at the lower end in such a manner as to restrict the flow of the milk. To this end each teat-cup comprises a cylindrical body portion or casing 1 having its lower end tapered, as shown at 2, and provided with a nipple 3 by means of which the cup is connected with a conduit, such as a flexible tube 4. The body of the cup, at that end opposite the nipple 3 is provided with a diaphragm, or flexible washer, 5, having a central aperture 6 to receive the teat. The teat is drawn through the opening 6 by the suction in the cup and the diaphragm serves not only to form an airtight connection between the wall of the cup and the teat, but also serves, under ordinary conditions, to support the casing on the teat and out of engagement therewith. This diaphragm, or washer, is secured to the cup in such a manner that it can be very quickly removed and cleaned, or renewed. In the present construction, the body portion of the cup is provided at its upper end with a shoulder 7 on which the edge of the diaphragm 5 rests, and to which it is clamped by means of a clamping collar, or top, 8, which is screw-threaded into the upper end of the body portion of the cup. Preferably, a washer 9 is interposed between the collar 8 and the diaphragm to prevent the latter from being displaced by the rotary movement of the collar and to more firmly retain the diaphragm in place. The collar, or top, 8, which forms the upper portion of the teat-cup extends some distance above the diaphragm and is flared outwardly so that when the cup is in position on the teat, this flared top portion thereof will receive a portion of the udder and because of the movement imparted to the teat by the action of the air pump will exert a mild pressure on the udder upon the upward movement of the cup which will facilitate the flow of milk to the teat. As will be apparent the teat-cup is very simple in its construction and is of such a character that every part thereof is readily accessible for the purpose of cleaning the same and it has no corners or cavities from which it will be difficult to remove the milk. Further, the shape and construction of the cup is such that it is highly efficient in removing the milk from the udder. Further, the diaphragm can be very quickly and easily cleaned, or removed, and is held securely in place when in its position in the cup.

The conduits 4 of the teat-cups lead to a manifold, or claw, 10, which serves to connect the several teat-cups with a single delivery conduit, such as a flexible tube 11. The claw, as here shown, comprises a body portion 12 having an upwardly flared portion, the upper edge of which is provided with internal screw-threads to receive a screw-threaded top, or cap, 13, which is provided with a series of nipples 14 for connection with the conduits 4. At the lower, or restricted, end of the body portion of the claw it is provided with a substantially horizontal conduit, or nipple, 15, by means of which it is connected with the conduit 11. This construction not only enables the claw to be readily taken apart to provide access to the interior parts thereof, thus enabling the device to be easily and thoroughly cleaned, but is free from crevices or corners which would be difficult to clean. The converging walls of the chamber merge into the nipple without forming an angle or crevice of any kind, and the nipples leading to the teat cups are formed integral with the disk-like closure so as to leave the inner surface of the closure smooth. Further the construction is very simple and can be produced at a low cost. The body portion of the claw is here shown as provided with a lug, or hook, 16, to enable a supporting strip to be secured thereto when it is necessary to provide an auxiliary means for supporting the mechanism on the udder.

The conduit 11 leads from the manifold, or claw, to the milk chamber, or suction chamber, which is connected with the air pump and the milk pail, or receptacle. This milk chamber is here shown as formed in a substantially cylindrical structure 17 and adapted to be mounted in the top wall, or lid, of the receptacle and having its outer end closed and its inner end provided with a valve controlled outlet leading to the receptacle. On opposite sides of the structure are provided conduits, or nipples, 18 and 19, the former being connected with the conduit 11 while the latter is connected with the conduit, or flexible tubing, 20, leading to the air pump. The interior of the receptacle, or chamber is substantially cylindrical, straight and smooth and the lower end thereof is closed by means of a closure, or valve, 21. Preferably, the lower edge of the wall of the chamber is arranged in an inclined plane and the valve 21 has a disk-like portion to engage this lower edge of the wall and close the opening of the chamber. This valve is pivotally mounted on one side of the structure 17 and is provided with a weight 22 arranged on the outer side of its axis to hold the same normally in its closed position. To enable the device to be cleaned and to permit the structure to be readily removed from the receptacle it is desirable that the valve should be readily removable from the structure. To this end I have provided the structure 17 on one side with an elongated bearing 23 having along one edge thereof a longitudinal slot 24. The closure 21 is provided with a pivot pin 25 which is preferably rigidly secured at its opposite ends to brackets 26 and 27 formed integral with the body of the valve. One of these brackets, 26, is of such a size and shape that when the valve member is moved to its wide open position, as shown in dotted lines in Fig. 5, this bracket will enter the slot 24 and thus permit the pivot pin 25 to be moved longitudinally in the bearing 23, thereby enabling the valve to be secured to or removed from the structure 17. When the valve has been moved toward its closed position the lower portion of the bearing 23 will enter the space between the brackets 26 and 27 and thus lock the pivot pin 25 against longitudinal movement in its bearing, and prevent the removal of the valve.

The structure 17 which contains the milk chamber is removably mounted on the top wall, or lid, of the milk receptacle and to this end the lid of the receptacle is provided with an opening 28 through which the lower portion of the structure extends. A flange 29, preferably formed integral with the structure 17, rests upon the lid about the edge of the opening 28 and supports the structure 17 thereon. To permit the passage of the bearing 23, the opening 28 in the lid is provided with a lateral extension 30. Mounted on the side of the structure 17, approximately in alinement with the bearing 24, are two lugs 31 spaced away from the flange 29 distances slightly greater than the thickness of the top wall, or lid, of the receptacle. These lugs 31 are of such a size and so mounted that they will pass through the opening 30 in the lid and when rotary movement is imparted to the structure 17 these lugs will be moved out of alinement with the opening 30 and will engage the top wall, or lid, of the structure and prevent the removal of the structure from the lid. The arrangement of the lugs with relation to the flange is such that the structure is held firmly in position on the lid but can be quickly and easily removed, a handle 32 being provided for rotating the same. If desired another lug 33 may be secured to the structure 17 opposite the lugs 31 and the opening in the lid provided with a second lateral extension 34 to permit the passage of the same. This second lug 33 is spaced away from the flange 29 in the same manner as are the lugs 31 and when used serves to prevent any tilting of the structure which might serve to weaken its connection with the lid. To prevent the accidental disconnection of the structure 17 from the lid I have provided a detent which is preferably a gravity detent and is here shown as a pin 35 loosely mounted in the flange 29 and arranged to be moved into alinement with one of the lateral extensions of the opening 28, preferably the larger extension 30, when rotary movement has been imparted to the structure to lock the same to the lid. As soon as the pin is moved into alinement with the opening it will drop through the same and thus prevent sufficient rotary movement being imparted to the structure to disconnect it from the lid until the pin has been lifted to its inoperative position. It will be apparent this construction is very simple and has a high degree of efficiency, moreover, it is of a highly sanitary character. Because of its construction access can be readily had to all parts thereof and every part thereof can be easily cleaned.

In many types of milking machines each unit includes a separate air pump, the separate air pumps being operated from a single source of power. I prefer, however, to utilize a single air pump and connect this pump with the several units, the construction and arrangement of the several parts of my mechanism being such as to permit of this being done. Therefore I connect the air tube 19 with a main air pipe 36 which leads to a suitable air pump, not here shown. The connection between the conduit 19 and the air pipe 30 is preferably formed by means of a valved nipple which enables the air to be cut off from the unit at any time. The air pipe 36 extends along the several stalls, preferably at the upper ends of the stanchions, and is provided with nipples 37 at suitable intervals, there being preferably a nipple at each stall, although a very satisfactory arrangement may be had by providing nipples only at alternate stalls. To prevent the pressure created in the air line by the relief stroke of the air pump from being strong enough to have undesirable results I have provided a relief valve in the air line between the nipple 37 and the air pump. This relief valve is here shown at 38 as an ordinary weighted pop valve, the weight on the valve being such as to permit sufficient air to pass to open the valve 21 and cause the proper operation of the mechanism, but to permit the relief valve to open and allow the escape of any pressure beyond what is desirable. To control the suction from the air pipe 36 so as to prevent the same from becoming sufficient to injure the cow or to be otherwise objectionable, I have provided an automatic relief valve 39 at that end of the air pipe remote from the air pump. A gage 40 is also provided to indicate the pressure within the air pipe. Consequently, the air conditions within the pipe are automatically controlled to accommodate them to variations in the work required. In a system designed to carry three milking units it is obvious that if but one unit is being operated the suction and pressure required would be much less than where three units were being operated. These variations are taken care of by the relief valves 38 and 39.

The operation and advantages of the several parts of the device have been pointed out in connection with the description thereof, and in addition to these advantages it will be noted that the organization of the device as a whole, together with the construction of the several parts thereof, enables me to utilize a main-line air pipe which is connected with a single air pump and has means for connecting therewith, or disconnecting therefrom, a plurality of milking units, and to accomplish this without the use of pulsators, the use of which has been considered necessary heretofore when a single air pump is used.

By constructing and arranging my device as shown and described, I can operate one or any desired number of units, within the limits of the system, from a single air pump. The milk will not be drawn into the air system and the alternate suction and pressure will be automatically regulated. Further, I wish it to be understood that I do not desire to be limited to the details of construction shown and described for obvious modifications will occur to a person skilled in the art.

Having thus fully described my invention, what I claim as new, and desire to secure by Letters Patent, is:—

1. In a milking apparatus, a teat cup comprising a substantially cylindrical, rigid body portion having its lower end tapered and adapted to be connected with a conduit, said body portion having at its upper end a shoulder, an apertured, flexible diaphragm resting on said shoulder, a top for said teat cup screwed into the upper end of said body portion to clamp said diaphragm onto said shoulder, said top extending above said diaphragm and being flared to receive and act upon the udder above the teat cup.

2. In a milking apparatus a claw comprising an integral body portion, having a chamber therein and a nipple communicating with one end of said chamber, the walls of said chamber converging toward and merging into said nipple, and a closure having a screw-threaded connection with that end of said body portion opposite said nipple, said closure having a plurality of nipples each communicating with said chamber.

3. In a milking apparatus a structure having a milking chamber adapted to be connected with an air conduit and with teat cups, and having a milk discharge opening, an automatically operated valve to open and close said discharge opening, and a separable connection between said valve and said structure, said connection having means controlled by the movement of said valve to prevent the separation of the parts of said connection when said valve is in one position, and to permit such separation when said valve is in another position.

4. In a milking apparatus, a structure having a milking chamber adapted to be connected to an air conduit and with teat cups, and having a milk discharge opening, an automatically operated valve to open and close said discharge opening, and a pivotal connection between said valve and said structure comprising a bearing and a pivot pin removably mounted in said bearing, said bearing and said pivot pin having parts coöperating to prevent the removal of said pivot pin when said valve is in one position, and to permit such removal when said valve is in another position.

5. In a milking apparatus, the combination with an air conduit and a plurality of teat cups, of a structure interposed between said air conduit and said teat cups and having a milk chamber connected with said teat cups and with said air conduit, and an automatically operated valve to normally close the lower end of said chamber, said structure having a bearing and said valve having a pivot pin movable axially into and out of said bearing to connect said valve with or disconnect the same from said structure.

6. In a milking apparatus, the combination with an air conduit and a plurality of teat cups, of a structure interposed between said air conduit and said teat cups and having a milk chamber connected with said teat cups and with said air conduit, an automatically operated valve to normally close the lower end of said chamber, said structure having a bearing and said valve having a pivot pin movable axially into and out of said bearing to connect said valve with or disconnect the same from said structure, and means controlled by the position of said valve to prevent the removal of said pivot pin from said bearing.

7. In a milking apparatus, the combination with an air conduit and a plurality of teat-cups, of a structure interposed between said air conduit and said teat-cups and having a milk chamber connected with the said teat-cups and with said air conduit, a valve to close the lower end of said structure, a slotted bearing mounted on one side of said structure and having one end open, a pivot pin connected with said valve and adapted to be moved axially into and out of said bearing, and means to hold said valve normally in its closed position.

8. In a milking apparatus, a structure having a milk chamber, a valve to close the lower end of said chamber, a bearing carried by one side of said structure and having a longitudinal slot, a pivot pin carried by said valve, supporting brackets for securing said pivot pin to said valve, said pivot pin being adapted to enter said bearing and one of said brackets being shaped to enter the slot in said bearing when said valve is in a predetermined position whereby said valve can be readily attached to and removed from said structure.

9. In a milking apparatus, a structure having a milk chamber, a valve to close the lower end of said chamber, a bearing carried by one side of said structure and having a longitudinal slot, a pivot pin carried by said valve, supporting brackets for securing said pivot pin to said valve, said pivot pin being adapted to enter said bearing and one of said brackets being shaped to enter the slot in said bearing when said valve is in a predetermined position, whereby said valve member can be readily attached to and removed from said structure, and means for retaining said valve normally in its closed position.

10. In a milking apparatus, a structure having a milk chamber, a valve to close the lower end of said chamber, a bearing carried by one side of said structure and having a longitudinal slot, a pivot pin carried by said valve, supporting brackets for securing said pivot pin to said valve, said pivot pin being adapted to enter said bearing and one of said brackets being shaped to enter the slot in said bearing when said valve is in a predetermined position whereby said valve member can be readily attached to and removed from said structure, a weight secured to said valve on the outer side of said bearing and adapted to hold said valve normally in its closed position.

11. In a milking apparatus, a pail having a top wall provided with an opening, a structure having a milk chamber and having a portion adapted to extend through the opening in said top wall, said structure also having a flange adapted to rest upon said top wall about said opening, and means controlled by the rotary movement of said structure to secure the same to said top wall and lock the same against removal therefrom.

12. In a milking apparatus, a milk receptacle having a top wall provided with an opening, said opening having a lateral extension, a structure adapted to extend through said opening and having a milk chamber, said structure also having a flange to engage said top wall and support said structure thereon with one end within the receptacle, a valve to close the inner end of said chamber, a bearing carried by one wall of said structure to support said valve, said bearing being adapted to pass through the extension of the opening in said top wall when said structure is inserted in or removed from said opening, and lugs secured to said structure between said bearing and said flange and spaced away from said flange, said lugs being adapted to pass through the extension of said opening and to be moved out of alinement with said extension by the rotary movement of said structure.

13. In a milking apparatus, a milk receptacle having a top wall provided with an opening, said opening having a lateral extension, a structure adapted to extend through said opening and having a milk chamber, said structure also having a flange to engage said top wall and support said structure thereon with one end within the receptacle, a valve to close the inner end of said chamber, a bearing carried by one wall of said structure to support said valve, said bearing being adapted to pass through the extension of the opening in said top wall when said structure is inserted in or removed from said opening, lugs secured to said structure between said bearing and said flange and spaced away from said flange, said lugs being adapted to pass through the extension of said opening and to be moved out of alinement with said extension by the rotary movement of said structure, and a gravity detent carried by said flange and adapted to enter the extension of said opening while said lugs are out of alinement therewith and thus prevent said lugs from being moved into alinement with said extension.

14. In a milking apparatus, a milk receptacle having a top wall provided with an opening, said opening having a lateral extension, a structure having a milk chamber and having a portion adapted to extend through the opening in said top wall into said receptacle, said structure also having a flange to engage said top wall and support the structure thereon, lugs secured to said structure beneath said flange and spaced away therefrom, said lugs being adapted to pass through the extension to said opening when said structure is inserted in said opening and be moved out of alinement with said opening when rotary movement is imparted to said structure, and a pin loosely mounted in said flange adapted to pass through said extension when said lug is moved out of alinement therewith.

15. In a milking apparatus, the combination with a milk receptacle having a top wall provided with an aperture, said aperture having lateral extensions, of a structure having a milk chamber and adapted to extend through the opening in said top wall, said structure also having a flange to engage said top wall and support said structure with its lower end in the receptacle, lugs secured to said structure and arranged to pass through the respective extensions to said opening, said lugs being spaced away from said flange to permit said top wall to enter the space between the lugs and the flange when the lugs are moved out of alinement with the respective extensions, a pivoted valve to close the lower end of said structure, a bearing mounted on one side of said structure and adapted to pass through one of the extensions to the opening in said top wall, and a pivot pin carried by said valve and removably mounted in said bearing.

16. In a milking apparatus, an air pipe adapted to be connected with an air pump and having a plurality of valved connecting devices whereby one or more milking units may be connected therewith, and automatic regulating valves arranged near the respective ends of said pipe to regulate the suction in said pipe and to supply air thereto.

In testimony whereof, I affix my signature hereto.

SAMUEL B. HARNER.